US009952920B2

(12) United States Patent
Inoue

(10) Patent No.: US 9,952,920 B2
(45) Date of Patent: Apr. 24, 2018

(54) INFORMATION PROCESSING DEVICE, INFORMATION PROCESSING METHOD, AND PROGRAM

(71) Applicant: Kabushiki Kaisha Toshiba, Minato-ku, Tokyo (JP)

(72) Inventor: Atsushi Inoue, Fuchu Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/915,885

(22) PCT Filed: Nov. 20, 2014

(86) PCT No.: PCT/JP2014/080812
§ 371 (c)(1),
(2) Date: Mar. 1, 2016

(87) PCT Pub. No.: WO2015/087684
PCT Pub. Date: Jun. 18, 2015

(65) Prior Publication Data
US 2016/0274960 A1    Sep. 22, 2016

(30) Foreign Application Priority Data

Dec. 13, 2013 (JP) .................................. 2013-258635

(51) Int. Cl.
*G06F 11/07* (2006.01)
*G06F 13/00* (2006.01)
(Continued)

(52) U.S. Cl.
CPC .......... *G06F 11/073* (2013.01); *G06F 11/079* (2013.01); *G06F 11/0724* (2013.01);
(Continued)

(58) Field of Classification Search
CPC ................................................... G06F 11/073
(Continued)

(56) References Cited

U.S. PATENT DOCUMENTS 7,949,931 B2 * 5/2011 Lastras-Montano  G06F 11/1044
714/768
8,234,661 B1 * 7/2012 Huang .................. G06F 13/102
710/43
(Continued)

FOREIGN PATENT DOCUMENTS

JP    01-140361    6/1989
JP    02-252043    10/1990
(Continued)

OTHER PUBLICATIONS

International Search Report for International application No. PCT/JP2014/080812, dated Feb. 24, 2015.

*Primary Examiner* — Dieu Minh T Le
(74) *Attorney, Agent, or Firm* — Knobbe, Martens, Olson & Bear, LLP

(57) ABSTRACT

An information processing device according to an embodiment includes a buffer, a memory, and a controller. The buffer is capable of storing target data for transfer. The memory is capable of storing a fact that predetermined abnormality detection data is written in the buffer and storing an abnormality detection result of the buffer, the abnormality detection result being written by an external controller which controls a first control target. The controller controls a second control target which is different than the first control target; writes, in the buffer, the abnormality detection data to be transferred to the external controller; makes the memory to hold the fact; and, when the abnormality detection result indicates detection of abnormality, prohibits writing of data in at least such memory areas, from among memory areas in the buffer, in which abnormality is detected.

10 Claims, 12 Drawing Sheets

(51) Int. Cl.
*G06F 13/38* (2006.01)
*G06F 11/22* (2006.01)
*G06F 11/30* (2006.01)

(52) U.S. Cl.
CPC ...... *G06F 11/0787* (2013.01); *G06F 11/2236* (2013.01); *G06F 11/3037* (2013.01); *G06F 13/00* (2013.01); *G06F 13/38* (2013.01)

(58) Field of Classification Search
USPC .......................... 714/54, 47.1, 42, 702, 718
See application file for complete search history.

(56) References Cited

U.S. PATENT DOCUMENTS

| | | | | |
|---|---|---|---|---|
| 2012/0131382 | A1* | 5/2012 | Higeta | G06F 11/0724 714/6.13 |
| 2013/0117620 | A1* | 5/2013 | Joo | G11C 16/10 714/746 |
| 2014/0172371 | A1* | 6/2014 | Zhu | G06F 11/0709 702/185 |

FOREIGN PATENT DOCUMENTS

| | | |
|---|---|---|
| JP | 05-265886 | 10/1993 |
| JP | 2004-252825 | 9/2004 |
| JP | 2005-071075 A | 3/2005 |

* cited by examiner

INFORMATION PROCESSING DEVICE, INFORMATION PROCESSING METHOD, AND PROGRAM

CROSS-REFERENCE TO RELATED APPLICATIONS

This application is national stage application of International Application No. PCT/JP2014/080812, filed Nov. 20, 2014, which designates the United States, incorporated herein by reference, and which claims the benefit of priority from Japanese Patent Application No. 2013-258635, filed on Dec. 13, 2013, the entire contents of which are incorporated herein by reference.

FIELD

Embodiments described herein relates generally to an information processing device, an information processing method, and a computer program product.

BACKGROUND

In a communication system including Micro-Processing Units (MPUs) that perform data processing and that have different control targets; a buffer is installed so as to temporarily store data which is to be communicated among the MPUs performing coordinated operations, so that the differences in the processing speeds and the transfer speeds among the MPUs are compensated. In such a communication system, at the time of communicating data among the MPUs having different bus widths of the data bus, the data transfer speed can be enhanced.

However, in the communication system mentioned above, the buffer merely provides the function of storing the data. Thus, even if abnormal data that is attributed to abnormality occurring while reading data from or writing data in the buffer is sent to the receiver MPU, neither the sender MPU nor the receiver MPU can confirm the presence or absence of data abnormality. Thus, abnormal data attributed to abnormality in the buffer gets transferred.

DETAILED DESCRIPTION

In general, according to an embodiment, an information processing device comprises a buffer, a memory, and a controller. The buffer is capable of storing target data for transfer. The memory is capable of storing a fact that predetermined abnormality detection data is written in the buffer and storing abnormality detection result of the buffer, the abnormality detection result being written by an external controller which controls a first control target. The controller controls a second control target which is different than the first control target, writes, in the buffer, the abnormality detection data to be transferred to the external controller, makes the memory to hold the fact that the abnormality detection data is written in the buffer, and when the abnormality detection result indicates detection of abnormality, prohibits writing of data in at least such a memory area, from among memory areas in the buffer, in which abnormality is detected.

Exemplary embodiments of an information processing device, an information processing method, and a computer program product are described below with reference to the accompanying drawings.

First Embodiment

Figure 1:
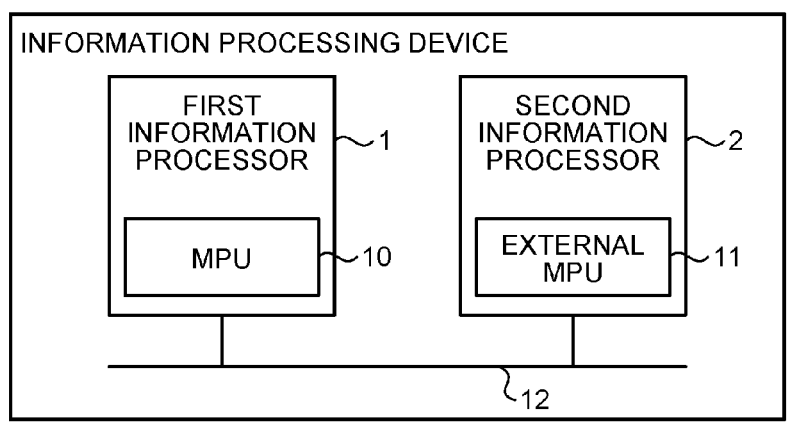
FIG. 1 is a block diagram illustrating a configuration of an information processing device according to a first embodiment.

FIG. 1 is a block diagram illustrating a configuration of an information processing device according to a first embodiment. As illustrated in FIG. 1, the information processing device according to the first embodiment includes a first information processor 1 and a second information processor 2 that are connected to each other via a system bus 12. The first information processor 1 includes a Micro-Processing Unit (MPU) 10. The second information processor 2 includes an external MPU 11, which is an example of an external controller that controls a first control target (not illustrated). The MPU 10 is an example of a controller that controls a second control target which is different than the first control target controlled by the external MPU 11. The MPU 10 and the external MPU 11 can perform various operations in a coordinated manner. In the first embodiment, although the first information processor 1 and the second information processor 2 are connected to each other via the system bus 12; that is not the only possible case. Alternatively, for example, the first information processor 1 and the second information processor 2 can be connected via a communication cable such as a tracking cable. In the first embodiment, the MPU 10 and the external MPU 11 are installed in the same information processing device. However, alternatively, the MPU 10 and the external MPU 11 can be installed in different information processing devices.

Figure 2:
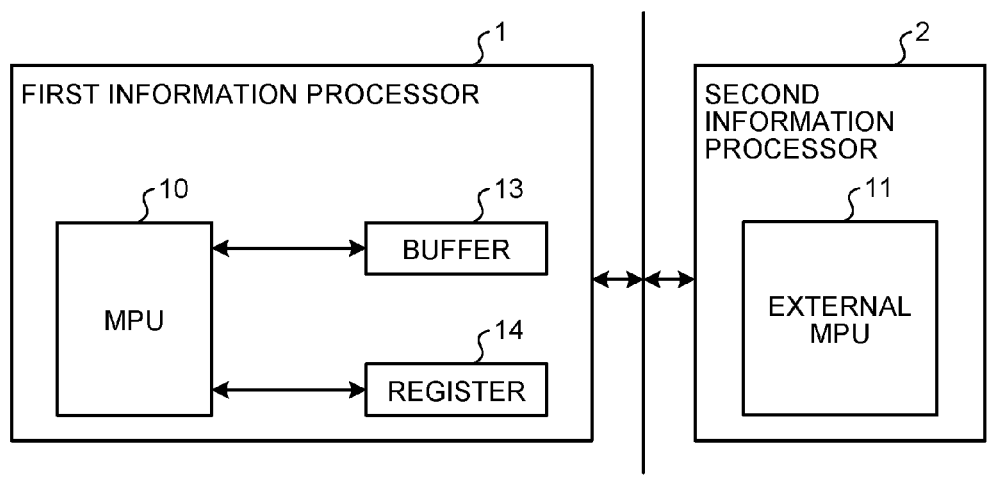
FIG. 2 is a diagram illustrating a hardware configuration of the information processing device according to the first embodiment.

FIG. 2 is a diagram illustrating a hardware configuration of the information processing device according to the first embodiment. As illustrated in FIG. 2, the first information processor 1 according to the first embodiment includes the MPU 10, a buffer 13 that is capable of storing data to be transferred between the external MPU 11 and the MPU 10, and a register 14 (an example of a memory) that is capable of storing the storage state of data with respect to the buffer 13. As illustrated in FIG. 2, the second information processor 2 includes the external MPU 11 that controls the first control target.

Figure 3:
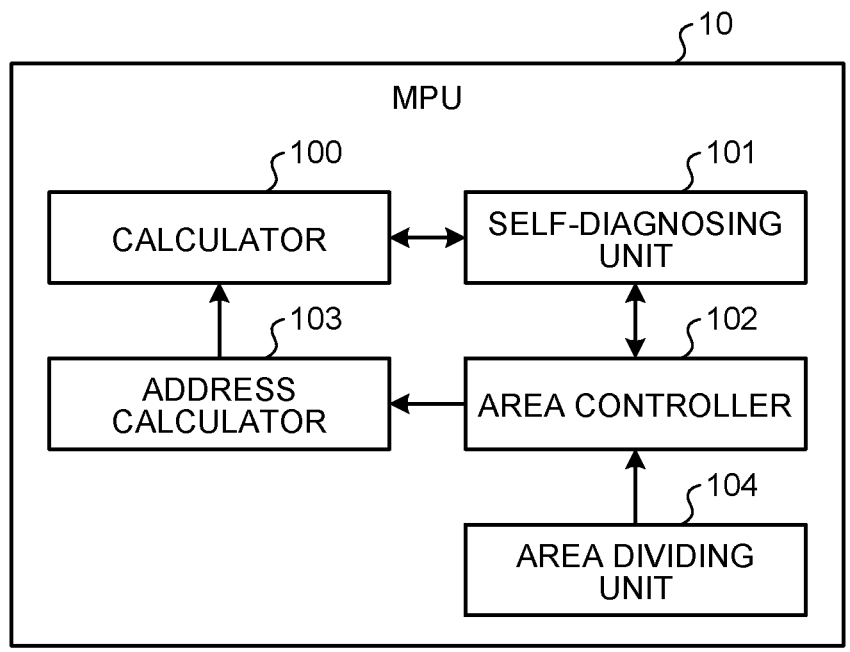
FIG. 3 is a block diagram illustrating a functional configuration of an MPU included in the information processing device according to the first embodiment.

FIG. 3 is a block diagram illustrating a functional configuration of an MPU included in the information processing device according to the first embodiment. As illustrated in FIG. 3, the MPU 10 includes a calculator 100 that performs a variety of processing such as sending data to the external MPU 11; a self-diagnosing unit 101 that writes, in the buffer 13, predetermined abnormality detection data (hereinafter, called test data) that is used in detecting abnormality in the buffer 13; an area controller 102 that controls the writing of data in the buffer 13 according to the abnormality detection result regarding the buffer 13; an address calculator 103 that calculates the addresses of such areas in the buffer 13 in which the data to be sent to the external MPU 11 is to be written; and an area dividing unit 104 that divides the memory area of the buffer 13 in a plurality of memory areas (in the first embodiment, a first memory area 130, a second memory area 131, and a backup area 132 (described later)).

Figure 4:
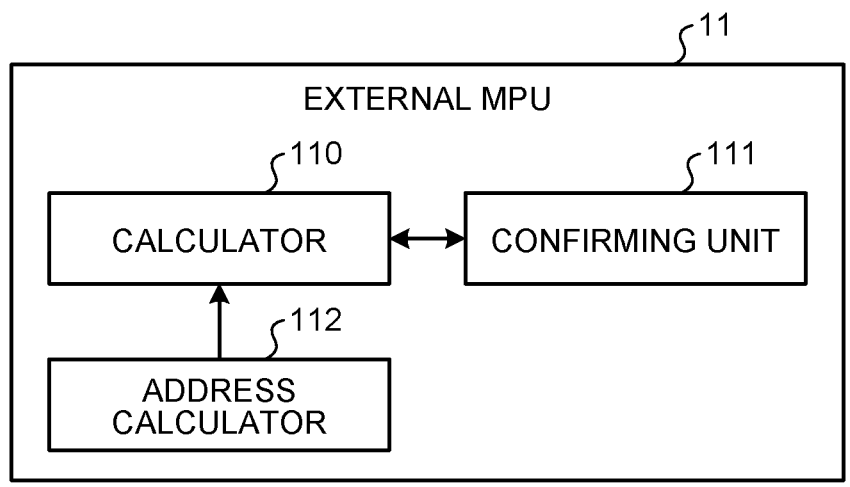
FIG. 4 is a block diagram illustrating a functional configuration of an external MPU included in the information processing device according to the first embodiment.

FIG. 4 is a block diagram illustrating a functional configuration of an external MPU included in the information processing device according to the first embodiment. As illustrated in FIG. 4, the external MPU 11 includes a calculator 110 that performs a variety of processing such as sending data to the MPU 10; a confirming unit 111 that detects abnormality in the buffer 13 using the test data written in the buffer 13; and an address calculator 112 that calculates such addresses in the buffer 13 in which the data to be sent to the MPU 10 is to be written.

Figure 5:
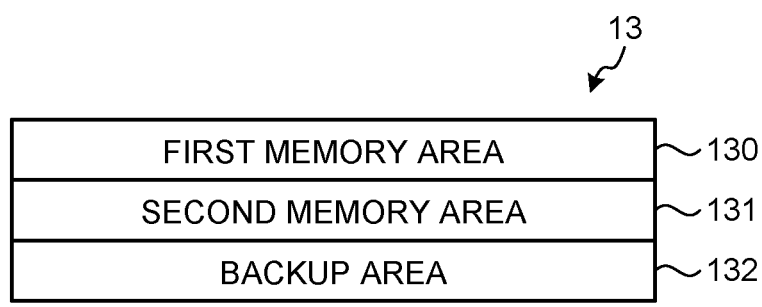
FIG. 5 is a diagram illustrating a configuration of a buffer included in the information processing device according to the first embodiment.

FIG. 5 is a diagram illustrating a configuration of a buffer included in the information processing device according to the first embodiment. In the first embodiment, as illustrated in FIG. 5, the buffer 13 includes a first memory area 130 used in storing data to be transferred from the MPU 10 to the external MPU 11; a second memory area 131 used in storing data to be transferred from the external MPU 11 to the MPU 10; and the backup area 132 usable in taking backup of the data stored in the first memory area 130 and the second memory area 131.

Figure 6:
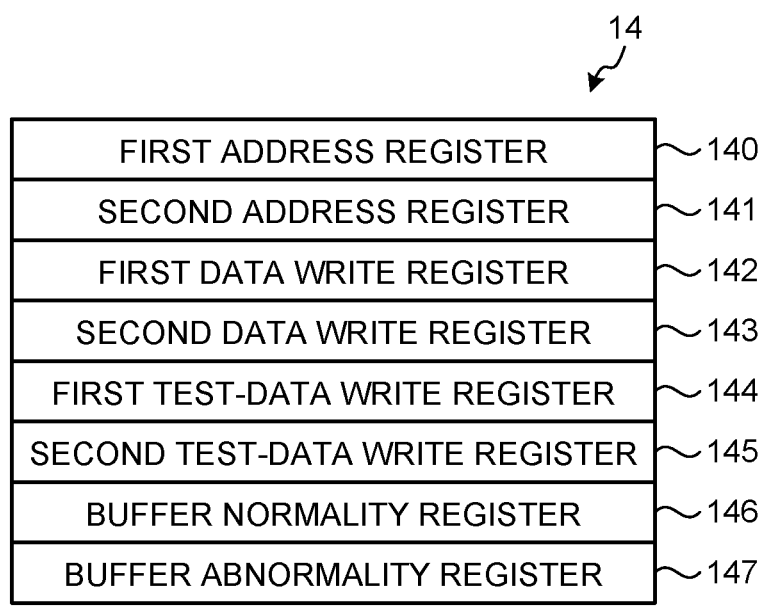
FIG. 6 is a diagram illustrating a configuration of a register included in the information processing device according to the first embodiment.

FIG. 6 is a diagram illustrating a configuration of a register included in the information processing device according to the first embodiment. In the first embodiment, as illustrated in FIG. 6, the register 14 includes a first address register 140 capable of holding the addresses of such areas in the first memory area 130 in which data is stored; a second address register 141 capable of holding the addresses of such areas in the second memory area 131 in which data is stored; a first data write register 142 capable of holding the storage state of the target data for transfer with respect to the first memory area 130; a second data write register 143 capable of holding the storage state of the target data for transfer with respect to the second memory area 131; a first test-data write register 144 capable of holding the storage state of test data with respect to the first memory area 130; a second test-data write register 145 capable of holding the storage state of test data with respect to the second memory area 131; a buffer normality register 146 capable of holding data (in the first embodiment, called "ON") which indicates the abnormality detection result regarding the buffer 13 (i.e., which indicates that no abnormality was detected in the buffer 13) and written by the external MPU 11; and a buffer abnormality register 147 capable of holding data (in the first embodiment, called "ON") which indicates the abnormality detection result regarding the buffer 13 (i.e., which indicates that abnormality was detected in the buffer 13) and written by the external MPU 11.

Explained below with reference to FIGS. 3 to 6 is an operation of sending and receiving data as performed by the MPU 10 and the external MPU 11. Firstly, the explanation is given about an operation of sending data from the MPU 10 to the external MPU 11. In the case of sending data from the MPU 10 to the external MPU 11, the calculator 100 of the MPU 10 writes the data in such areas in the first memory area 130 of the buffer 13 which have the addresses calculated by the address calculator 103. Moreover, regarding the areas in the first memory area 130 in which data is written, the calculator 100 writes the addresses of those areas in the first address register 140 so that the addresses are held in the first address register 140. Furthermore, the calculator 100 writes, in the first data write register 142, data (in the first embodiment, called "ON") indicating that data is written in the first memory area 130, so that the data is held in the first data write register 142.

The calculator 110 of the external MPU 11 detects whether the data ("ON") is held in the first data write register 142. If it is detected that the data ("ON") is held in the first data write register 142, then the calculator 110 reads the addresses from the first address register 140. Moreover, the calculator 110 reads data from such areas in the first memory area 130 of the buffer 13 which have the read addresses. When data reading is completed, the calculator 110 writes, in the first data write register 142, data (in the first embodiment, called "OFF") indicating that the data stored in the first memory area 130 has been read, so that the data is held in the first data write register 142. In this way, in the information processing device according to the first embodiment, data is sent from the MPU 10 to the external MPU 11.

Given below is the explanation of an operation of sending data from the external MPU 11 to the MPU 10. In the case of sending data from the external MPU 11 to the MPU 10, the calculator 110 of the external MPU 11 writes data in such areas in the second memory area 131 of the buffer 13 that have their addresses obtained by the address calculator 103. Moreover, the calculator 110 writes, in the second address register 141, the addresses of those areas in the second memory area 131 in which data was written, so that the addresses are held in the second address register 141; as well as writes, in the second data write register 143, data (in the first embodiment, called "ON") indicating that data is written in the second memory area 131, so that the data is held in the second data write register 143.

The calculator 100 of the MPU 10 detects whether the data ("ON") is held in the second data write register 143. If it is detected that the data ("ON") is held in the second data write register 143, then the calculator 100 reads the addresses from the second address register 141. Moreover, the calculator 100 reads data from such areas in the second memory area 131 of the buffer 13 which have the read addresses. When data reading is completed, the calculator 100 writes, in the second data write register 143, data (in the first embodiment, called "OFF") indicating that the data stored in the second memory area 131 has been read, so that the data is held in the second data write register 143. In this way, in the information processing device according to the first embodiment, data is sent from the external MPU 11 to the MPU 10.

Explained below with reference to FIGS. 3 to 6 is an operation of detecting abnormality in the buffer 13. The self-diagnosing unit 101 of the MPU 10 writes test data in the buffer 13. Moreover, the self-diagnosing unit 101 writes, in the first address register 140 (or the second address register 141), the addresses of the areas in which the test data is written, so that the addresses are held in the first address register 140 (or the second address register 141); as well as writes, in the first test-data write register 144 (or the second test-data write register 145), data (in the first embodiment, called "ON") indicating that the test data is written, so that the data is held in the first test-data write register 144 (or the second test-data write register 145).

The confirming unit 111 of the external MPU 11 detects whether the data ("ON") is held in the first test-data write register 144 (or the second test-data write register 145). If it is detected that the data ("ON") is held in the first test-data write register 144 (or the second test-data write register 145), then the confirming unit 111 reads the addresses stored in the first address register 140 (or the second address register 141). Moreover, the confirming unit 111 reads test data from the areas in the buffer 13 that have the read addresses. When reading of the test data is completed, if the test data that is read does not match with test data set in advance (i.e., if there was an incidence of abnormality at the time of writing test data in the buffer 13 or reading test data from the buffer 13 so that test data could not be read from the buffer 13), then the confirming unit 111 detects abnormality in the buffer 13 and writes, in the buffer abnormality register 147, data (in the first embodiment, called "ON") indicating that abnormality is detected in the buffer 13. On the other hand, if the test data that is read matches with the test data set in advance (i.e., if there was no abnormality at the time of writing test data in the buffer 13 or reading test data from the buffer 13 so that test data could be read from the buffer 13), the confirming unit 111 writes, in the buffer normality register 146, data (in the first embodiment, called "ON") indicating that the buffer 13 is normal.

If the data ("ON") is held in the buffer normality register 146, then the self-diagnosing unit 101 of the MPU 10 continues with the writing of test data in the buffer 13. Moreover, the self-diagnosing unit 101 writes data ("OFF") in the buffer normality register 146 so that the data is held in the buffer normality register 146.

If the data ("ON") is held in the buffer abnormality register 147, then the calculator 100 of the MPU 10 prohibits writing of data in at least such areas in which abnormality of the buffer 13 is detected (i.e., such areas in the buffer 13 which have the addresses held in the first address register 140 or the second address register 141). Moreover, the self-diagnosing unit 101 stops writing the test data in the buffer 13, and writes data ("OFF") in the buffer abnormality register 147 so that the data is held in the buffer abnormality register 147. As a result, when abnormal data attributed to abnormality in the buffer 13 is sent to the external MPU 11, it becomes possible for the external MPU 11 to detect abnormality in the data and prohibit data writing in the buffer 13. That enables preventing transfer of abnormal data attributed to abnormality in the buffer 13.

Figure 7:
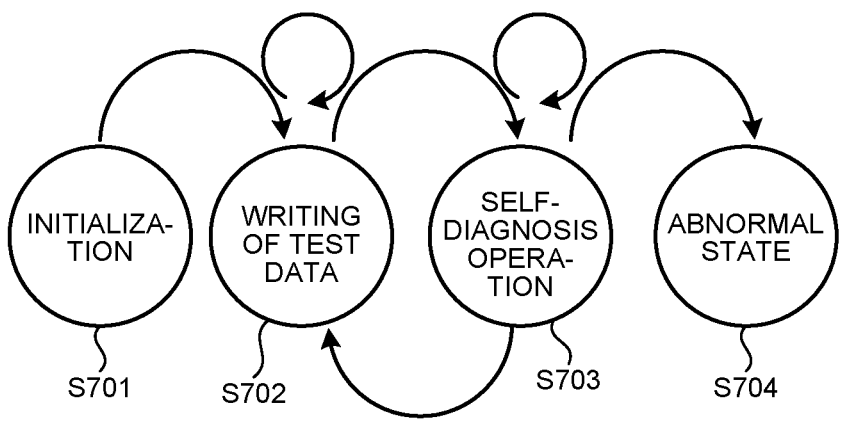
FIG. 7 is a diagram for explaining an operation of detecting abnormality in a buffer of an MPU included in the information processing device according to the first embodiment.
Figure 8:
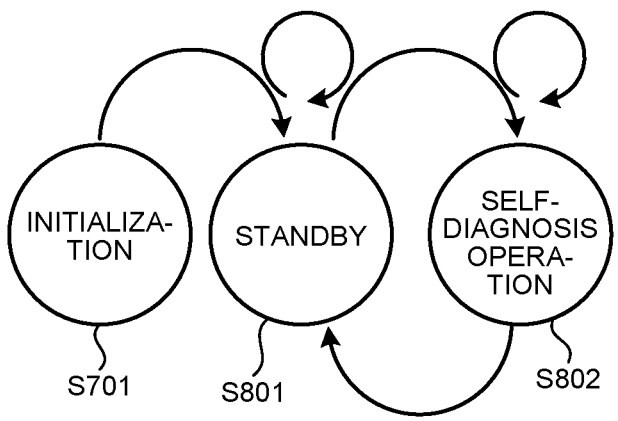
FIG. 8 is a diagram for explaining an operation of detecting abnormality in a buffer of an external MPU included in the information processing device according to the first embodiment.
Figure 9:
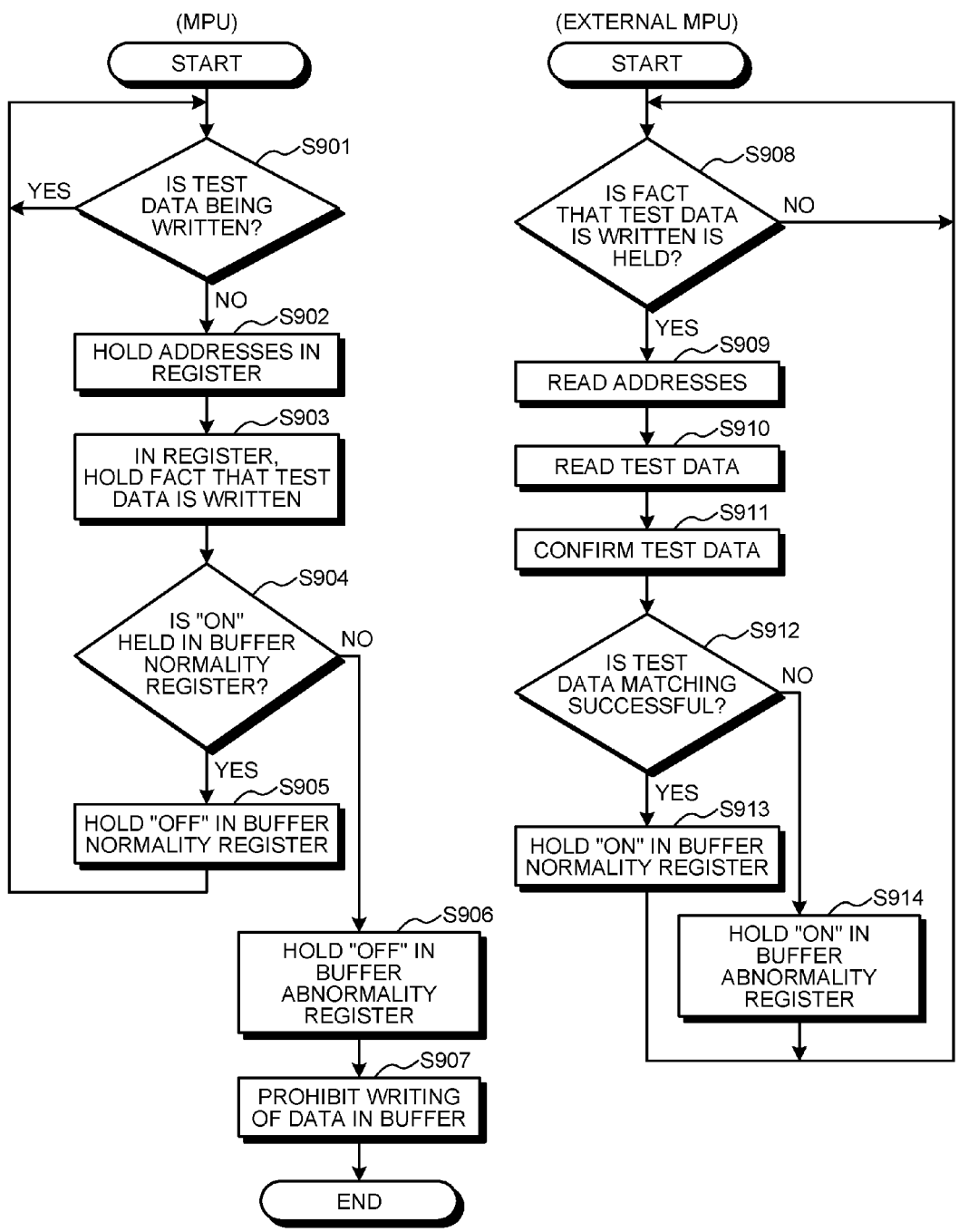
FIG. 9 is a flowchart for explaining a flow of operations performed to detect abnormality in a buffer in the information processing device according to the first embodiment.

Explained below in detail with reference to FIGS. 7 to 9 is an operation of detecting abnormality in the buffer 13 in the information processing device according to the first embodiment. FIG. 7 is a diagram for explaining the operation of detecting abnormality in a buffer of an MPU included in the information processing device according to the first embodiment. FIG. 8 is a diagram for explaining the operation of detecting abnormality in a buffer of an external MPU included in the information processing device according to the first embodiment. FIG. 9 is a flowchart for explaining a flow of operations performed to detect abnormality in a buffer in the information processing device according to the first embodiment.

In the first embodiment, when an instruction for initialization of the information processing device is issued (Step S701 illustrated in FIG. 7), the self-diagnosing unit 101 of the MPU 10 starts writing test data in the buffer 13 (Step S702 illustrated in FIG. 7 and Step S901 illustrated in FIG. 9). When the writing of test data in the buffer 13 is completed (No at Step S901 illustrated in FIG. 9), the self-diagnosing unit 101 writes, in the first address register 140 (or the second address register 141), the addresses of such areas in the buffer 13 in which the test data is written, so that the addresses are held in the first address register 140 (or the second address register 141) (Step S902 illustrated in FIG. 9). Moreover, the self-diagnosing unit 101 writes, in the first test-data write register 144 (or the second test-data write register 145), data ("ON") indicating that the test data is written, so that the data is held in the first test-data write register 144 (or the second test-data write register 145) (Step S903 illustrated in FIG. 9).

Once the data ("ON") is written in the first test-data write register 144 (or the second test-data write register 145), the self-diagnosing unit 101 performs a self-diagnosis operation for determining whether or not data ("ON") indicating that the buffer 13 is normal is held in the buffer normality register 146 (Step S703 illustrated in FIG. 7 and Step S904 illustrated in FIG. 9). If data ("ON") indicating that the buffer 13 is normal is held in the buffer normality register 146 (Yes at Step S904 illustrated in FIG. 9), then the self-diagnosing unit 101 writes data ("OFF") in the buffer normality register 146, so that the data is held in the buffer normality register 146 (Step S905 illustrated in FIG. 9). Subsequently, the system control returns to Step S901, and the self-diagnosing unit 101 writes test data in such areas in the buffer 13 in which test data is not yet written.

On the other hand, if data ("ON") indicating that the buffer 13 is not normal is held in the buffer abnormality register 147 (Step S704 illustrated in FIG. 7 and No at Step S904 illustrated in FIG. 9), then the self-diagnosing unit 101 writes data ("OFF") in the buffer abnormality register 147, so that the data is held in the buffer abnormality register 147 (Step S906). Moreover, the calculator 100 determines that the buffer 13 is in an abnormal state, and prohibits writing of data in the buffer 13 (Step S907 illustrated in FIG. 9). As a result, when abnormal test data attributed to abnormality in the buffer 13 is sent to the external MPU 11, the abnormality in the test data is detected in the external MPU 11 and data transfer using the buffer 13 is no more performed. That enables preventing transfer of abnormal data attributed to abnormality in the buffer 13.

Meanwhile, when an instruction for initialization of the information processing device is issued (Step S701 illustrated in FIG. 8), the confirming unit 111 of the external MPU 11 waits until data ("ON") indicating that the test data is written in the first test-data write register 144 (or the second test-data write register 145) (Step S801 illustrated in FIG. 8 and Step S908 illustrated in FIG. 9). When the data ("ON") is held in the first test-data write register 144 (or the second test-data write register 145) (Yes at Step S908 illustrated in FIG. 9), the confirming unit 111 reads the addresses held in the first address register 140 (or the second address register 141) (Step S909). Then, the confirming unit 111 reads the test data from such areas in the buffer 13 which have the read addresses (Step S910 illustrated in FIG. 9). Moreover, the confirming unit 111 performs a self-diagnosis operation for confirming whether or not the test data read from the buffer 13 matches with the test data stored in advance (Step S802 illustrated in FIG. 8 and Step S911 illustrated in FIG. 9).

If the test data read from the buffer 13 matches with the test data stored in advance (Yes at Step S912 illustrated in FIG. 9), then the confirming unit 111 writes, in the buffer normality register 146, data ("ON") indicating that the buffer 13 is normal, so that the data is held in the buffer normality register 146 (Step S913 illustrated in FIG. 9). On the other hand, if the test data read from the buffer 13 does not match with the test data stored in advance (No at Step S912 illustrated in FIG. 9), then the confirming unit 111 writes, in the buffer abnormality register 147, data ("ON") indicating that the buffer 13 is not normal, so that the data is held in the buffer abnormality register 147 (Step S914 illustrated in FIG. 9).

In this way, in the information processing device according to the first embodiment, when abnormal data attributed to abnormality in the buffer 13 is sent to the external MPU 11, the abnormality in the data can be detected in the external MPU 11 and the writing of data in the buffer 13 can be prohibited. That enables preventing transfer of abnormal data attributed to abnormality at the time of writing data in the buffer 13 or reading data from the buffer 13.

Second Embodiment

In a second embodiment is explained an example in which, in parallel to writing data in the target memory areas for writing from among a plurality of memory areas in a buffer, test data is written in the memory areas other than the target memory areas for writing. In the following explanation, the details identical to the first embodiment are not repeatedly explained.

Figure 10:
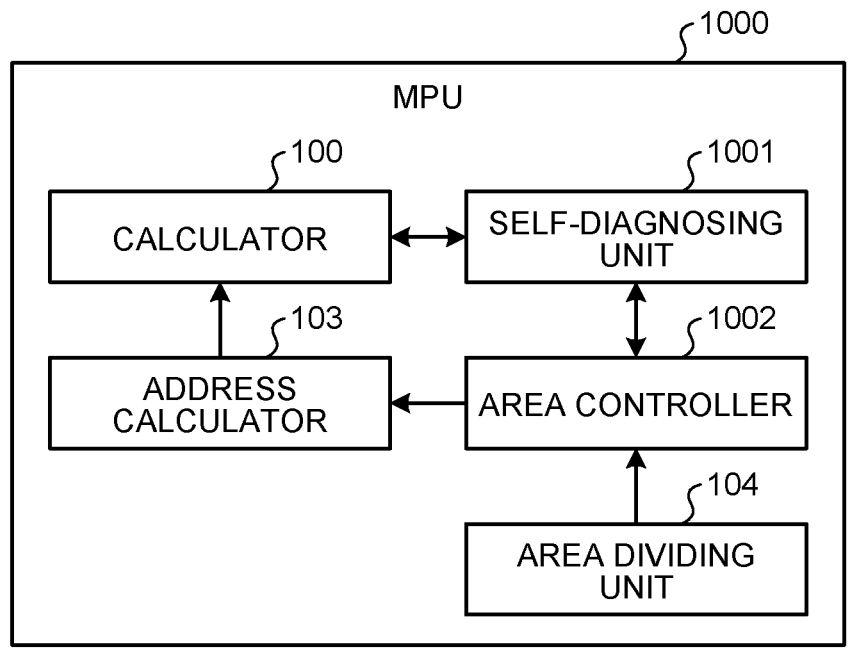
FIG. 10 is a block diagram illustrating a functional configuration of an MPU included in an information processing device according to a second embodiment.

FIG. 10 is a block diagram illustrating a functional configuration of an MPU included in an information processing device according to the second embodiment. As illustrated in FIG. 10, an MPU 1000 according to the second embodiment includes the calculator 100; the address calculator 103; the area dividing unit 104; a self-diagnosing unit 1001 that, in parallel to the operation of writing data in the target memory areas for writing from among a plurality of memory areas in the buffer 13, is capable of writing test data in the memory areas other than the target memory areas for writing; and an area controller 1002 that, according to abnormality detection results regarding memory areas, controls the memory areas in which data is written by the calculator 100.

Figure 11:
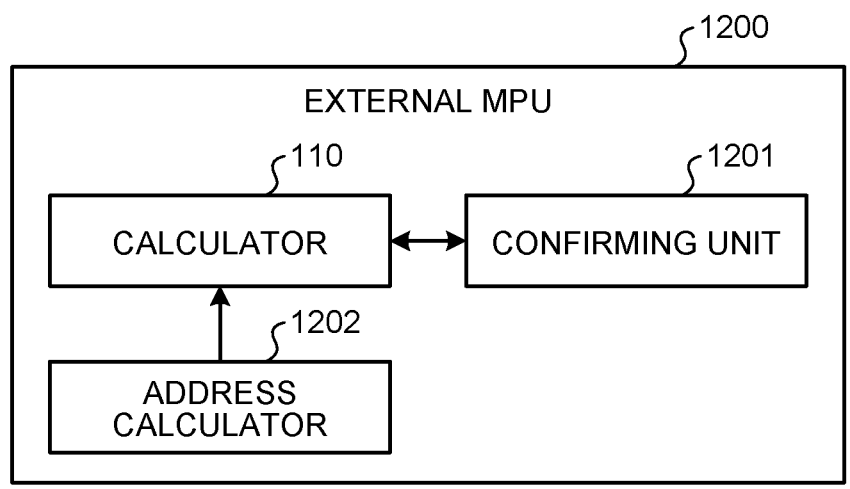
FIG. 11 is a block diagram illustrating a functional configuration of an external MPU included in the information processing device according to the second embodiment.

FIG. 11 is a block diagram illustrating a functional configuration of an external MPU included in the information processing device according to the second embodiment. As illustrated in FIG. 11, an external MPU 1200 according to the second embodiment includes the calculator 110; a confirming unit 1201 that, in parallel to the operation of reading data from the buffer 13 as performed by the calculator 110, is capable of detecting abnormality in the buffer 13; and an address calculator 1202 that refers to a switching register 148 (described later) (see FIG. 12) and controls the memory areas in which data is written by the calculator 110.

Figure 12:
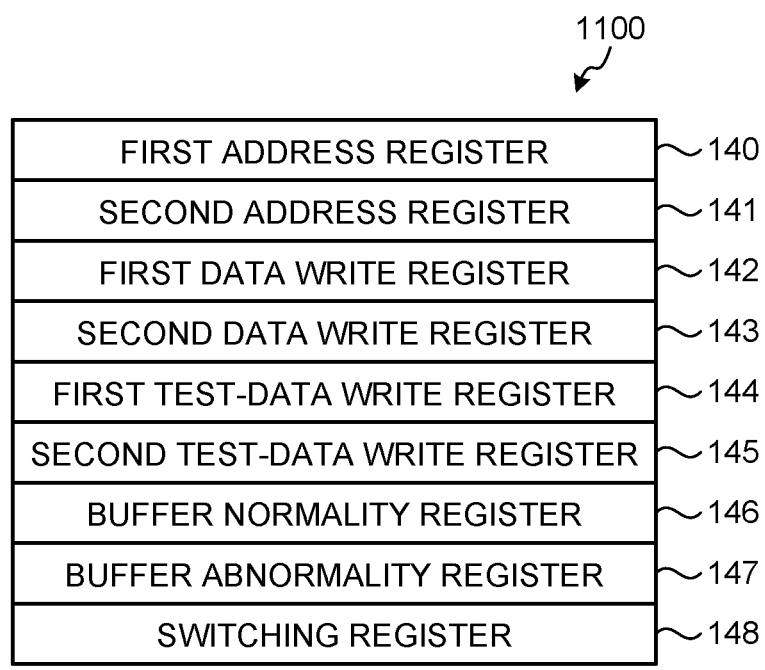
FIG. 12 is a diagram illustrating a configuration of a register included in the information processing device according to the second embodiment.

FIG. 12 is a diagram illustrating a configuration of a register included in the information processing device according to the second embodiment. In the second embodiment, as illustrated in FIG. 12, a register 1100 includes the first address register 140; the second address register 141; the first data write register 142; the second data write register 143; the first test-data write register 144; the second test-data write register 145; the buffer normality register 146; the buffer abnormality register 147; and the switching register 148 that is capable of holding data (in the second embodiment, called "ON") indicating that the memory area used in the transfer of data from the external MPU 11 to the MPU 10 is switched from the second memory area 131 to the backup area 132.

Figure 13:
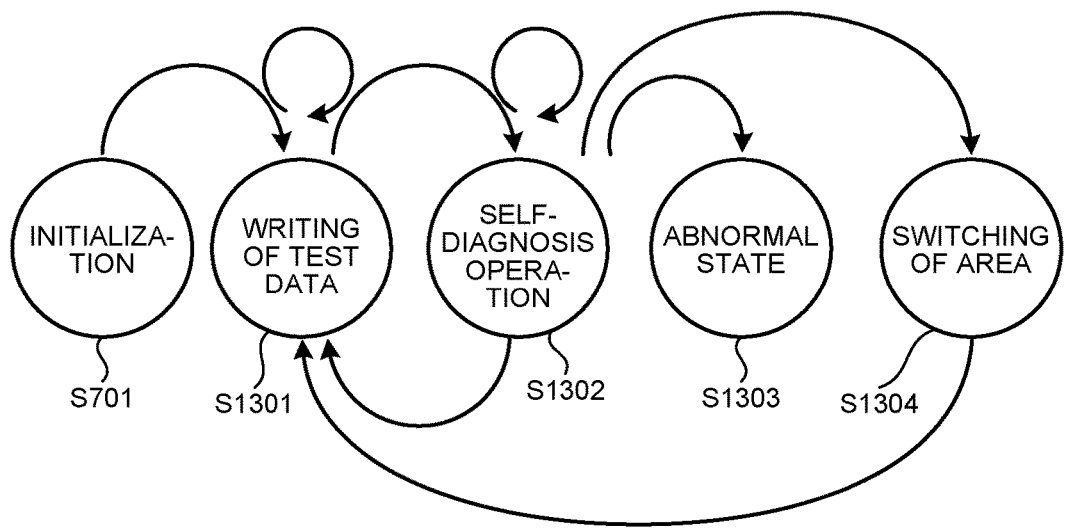
FIG. 13 is a diagram for explaining an operation of detecting abnormality in a buffer of an MPU included in the information processing device according to the second embodiment.
Figure 14:
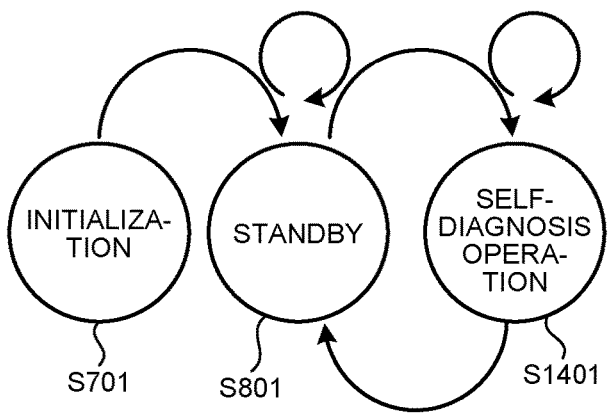
FIG. 14 is a diagram for explaining an example of detecting abnormality in a buffer of an external MPU included in the information processing device according to the second embodiment.
Figure 15:
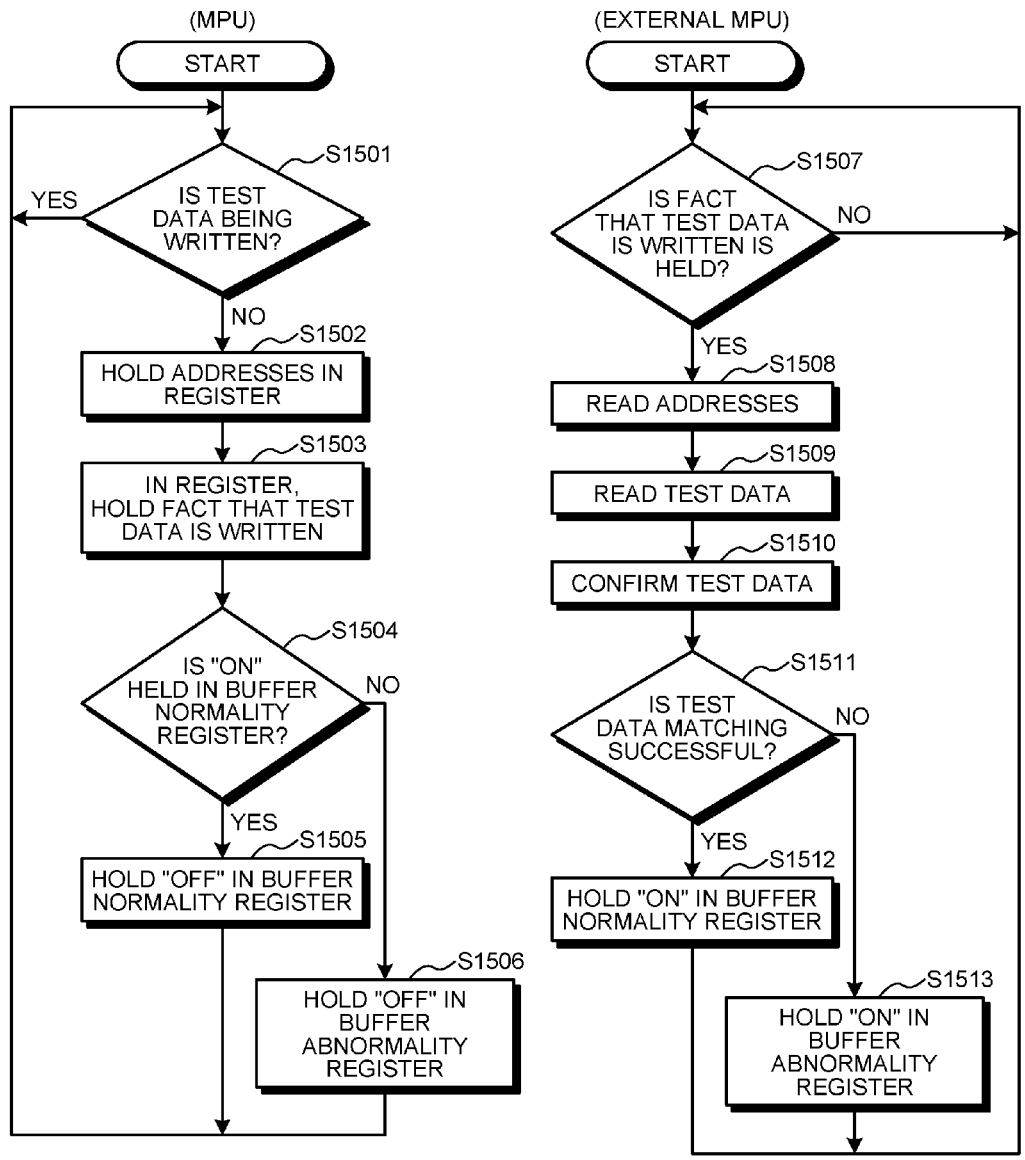
FIG. 15 is a flowchart for explaining a flow of operations performed to detect abnormality in a buffer in the information processing device according to the second embodiment.

Explained below with reference to FIGS. 13 to 15 is an operation of detecting abnormality in the buffer 13 in parallel to transmission and reception of data performed between the MPU 1000 and the external MPU 1200. FIG. 13 is a diagram for explaining an operation of detecting abnormality in a buffer of an MPU included in the information processing device according to the second embodiment. FIG. 14 is a diagram for explaining an example of detecting abnormality in a buffer of an external MPU included in the information processing device according to the second embodiment. FIG. 15 is a flowchart for explaining a flow of operations performed to detect abnormality in a buffer in the information processing device according to the second embodiment.

Firstly, the explanation is given for an operation of detecting abnormality in the backup area 132 that is performed in parallel to the operation of writing data in the first memory area 130. In the second embodiment, when an instruction for initialization of the information processing device is issued (Step S701 illustrated in FIG. 13), the self-diagnosing unit 1001 of the MPU 1000 starts writing test data in the backup area 132 in parallel to the operation of writing data in the first memory area 130 as performed by the calculator 100 (Step S1301 illustrated in FIG. 13 and Step S1501 illustrated in FIG. 15). When the writing of test data in the backup area 132 is completed (No at Step S1501 illustrated in FIG. 15), the self-diagnosing unit 1001 writes, in the first address register 140, the addresses of such areas in the backup area 132 in which the test data is written, so that the addresses are held in the first address register 140

(Step S1502 illustrated in FIG. 15). Moreover, the self-diagnosing unit 1001 writes, in the first test-data write register 144, data ("ON") indicating that the test data is written, so that the data is held in the first test-data write register 144 (Step S1503 illustrated in FIG. 15).

Once the data ("ON") is held in the first test-data write register 144, the self-diagnosing unit 1001 performs a self-diagnosis operation for determining whether or not data ("ON") indicating that the backup area 132 is normal is held in the buffer normality register 146 (Step S1302 illustrated in FIG. 13 and Step S1504 illustrated in FIG. 15). If the data ("ON") is held in the buffer normality register 146 (Yes at Step S1504), then the self-diagnosing unit 1001 writes data ("OFF") in the buffer normality register 146 so that the data is held in the buffer normality register 146 (Step S1505 illustrated in FIG. 15), and notifies the area controller 1002 about the fact that the backup area 132 is normal. Subsequently, the system control returns to Step S1501 illustrated in FIG. 15, and the self-diagnosing unit 1001 writes test data in such areas in the backup area 132 in which test data is not yet written.

On the other hand, if the data ("ON") indicating that the backup area 132 is not normal is held in the buffer abnormality register 147 (Step S1303 illustrated in FIG. 13 and No at Step S1504 illustrated in FIG. 15), then the self-diagnosing unit 1001 writes data ("OFF") in the buffer abnormality register 147 so that the data is held in the buffer abnormality register 147 (Step S1506 illustrated in FIG. 15), and notifies the area controller 1002 about the fact that the backup area 132 is not normal. Subsequently, the system control returns to Step S1501 illustrated in FIG. 15, and the self-diagnosing unit 1001 writes test data in such areas in the backup area 132 in which test data is not yet written.

When it is notified that all areas in the backup area 132 are normal, the area controller 1002 instructs the address calculator 103 to switch the target memory area for data writing from the first memory area 130 to the backup area 132 (Step S1304 illustrated in FIG. 13). The address calculator 103 calculates the addresses of the backup area 132 as the addresses of the areas for data writing, and switches the target memory area for data writing from the first memory area 130 to the backup area 132. Meanwhile, in case it is notified that at least some areas in the backup area 132 are not normal, then the area controller 1002 does not instruct switching of the target memory area for data writing.

Meanwhile, when an instruction for initialization of the information processing device is issued (Step S701 illustrated in FIG. 14), the confirming unit 1201 of the external MPU 1200 waits until data ("ON") indicating that the test data is written in the first test-data write register 144 (Step S801 illustrated in FIG. 14 and Step S1507 illustrated in FIG. 15). When the data ("ON") is held in the first test-data write register 144 (Yes at Step S1507 illustrated in FIG. 15), the confirming unit 1201 reads the addresses held in the first address register 140 (Step S1508 illustrated in FIG. 15). Then, the confirming unit 1201 reads the test data from such areas in the backup area 132 which have the read addresses (Step S1509 illustrated in FIG. 15). Moreover, the confirming unit 1201 performs a self-diagnosis operation for confirming whether or not the test data read from the backup area 132 matches with the test data stored in advance (Step S1401 illustrated in FIG. 14 and Step S1510 illustrated in FIG. 15).

If the test data read from the backup area 132 matches with the test data stored in advance (Yes at Step S1511 illustrated in FIG. 15), then the confirming unit 1201 writes, in the buffer normality register 146, data ("ON") indicating that the backup area 132 is normal so that the data is held in the buffer normality register 146 (Step S1512 illustrated in FIG. 15). On the other hand, if the test data read from the backup area 132 does not match with the test data stored in advance (No at Step S1511 illustrated in FIG. 15), then the confirming unit 1201 writes, in the buffer abnormality register 147, data ("ON") indicating that the backup area 132 is not normal so that the data is held in the buffer abnormality register 147 (Step S1513 illustrated in FIG. 15).

Given below is the explanation of an operation of detecting abnormality in the first memory area 130 performed in parallel to the operation of writing data in the backup area 132. When an instruction for initialization of the information processing device is issued (Step S701 illustrated in FIG. 13), the self-diagnosing unit 1001 starts writing test data in the first memory area 130 in parallel to the operation of writing data in the backup area 132 as performed by the calculator 100 (Step S1301 illustrated in FIG. 13 and Step S1501 illustrated in FIG. 15). When the writing of test data in the first memory area 130 is completed (No at Step S1501 illustrated in FIG. 15), the self-diagnosing unit 1001 writes, in the first address register 140, the addresses of such areas in the first memory area 130 in which the test data is written, so that the addresses are held in the first address register 140 (Step S1502 illustrated in FIG. 15). Moreover, the self-diagnosing unit 1001 writes, in the first test-data write register 144, data ("ON") indicating that the test data is written, so that the data is held in the first test-data write register 144 (Step S1503 illustrated in FIG. 15).

Once the data ("ON") is held in the first test-data write register 144, the self-diagnosing unit 1001 performs a self-diagnosis operation for determining whether or not data ("ON") indicating that the first memory area 130 is normal is held in the buffer normality register 146 (Step S1302 illustrated in FIG. 13 and Step S1504 illustrated in FIG. 15). If the data ("ON") indicating that the first memory area 130 is normal is held in the buffer normality register 146 (Yes at Step S1504), then the self-diagnosing unit 1001 writes data ("OFF") in the buffer normality register 146 so that the data is held in the buffer normality register 146 (Step S1505 illustrated in FIG. 15) and notifies the area controller 1002 about the fact that the first memory area 130 is normal. Subsequently, the system control returns to Step S1501 illustrated in FIG. 15, and the self-diagnosing unit 1001 writes test data in such areas in the first memory area 130 in which test data is not yet written.

On the other hand, if the data ("ON") indicating that the first memory area 130 is not normal is held in the buffer abnormality register 147 (Step S1303 illustrated in FIG. 13 and No at Step S1504 illustrated in FIG. 15), then the self-diagnosing unit 1001 writes data ("OFF") in the buffer abnormality register 147 so that the data is held in the buffer abnormality register 147 (Step S1506 illustrated in FIG. 15) and notifies the area controller 1002 about the fact that the first memory area 130 is not normal. Subsequently, the system control returns to Step S1501 illustrated in FIG. 15, and the self-diagnosing unit 1001 writes test data in such areas in the first memory area 130 in which test data is not yet written.

When it is notified that all areas in the first memory area 130 are normal, the area controller 1002 instructs the address calculator 103 to switch the target memory area for data writing from the backup area 132 to the first memory area 130 (Step S1304 illustrated in FIG. 13). The address calculator 103 calculates the addresses of the first memory area 130 as the addresses of the areas for data writing, and switches the target memory area for data writing from the backup area 132 to the first memory area 130. Meanwhile, in case it is notified that at least some areas in the first memory area 130 are not normal, then the area controller 1002 does not instruct switching of the target memory area for data writing.

Meanwhile, when an instruction for initialization of the information processing device is issued (Step S701 illustrated in FIG. 14), the confirming unit 1201 of the external MPU 1200 waits until data ("ON") indicating that the test data is written in the first test-data write register 144 (Step S801 illustrated in FIG. 14 and Step S1507 illustrated in FIG. 15). When the data ("ON") is held in the first test-data write register 144 (Yes at Step S1507 illustrated in FIG. 15), the confirming unit 1201 reads the addresses held in the first address register 140 (Step S1508 illustrated in FIG. 15). Then, the confirming unit 1201 reads the test data from such areas in the first memory area 130 which have the read addresses (Step S1509 illustrated in FIG. 15). Moreover, the confirming unit 1201 performs a self-diagnosis operation for confirming whether or not the test data read from the first memory area 130 matches with the test data stored in advance (Step S1401 illustrated in FIG. 14 and Step S1510 illustrated in FIG. 15).

If the test data read from the first memory area 130 matches with the test data stored in advance (Yes at Step S1511 illustrated in FIG. 15), then the confirming unit 1201 writes, in the buffer normality register 146, data ("ON") indicating that the first memory area 130 is normal, so that the data is held in the buffer normality register 146 (Step S1512 illustrated in FIG. 15). On the other hand, if the test data read from the first memory area 130 does not match with the test data stored in advance (No at Step S1511 illustrated in FIG. 15), then the confirming unit 1201 writes, in the buffer abnormality register 147, data ("ON") indicating that the first memory area 130 is not normal, so that the data is held in the buffer abnormality register 147 (Step S1513 illustrated in FIG. 15).

Meanwhile, when all areas in the backup area 132 are normal, the MPU 1000 and the external MPU 1200 perform abnormality detection with respect to the second memory area 131 too in an identical manner to abnormality detection performed with respect to the first memory area 130. While abnormality detection with respect to the second memory area 131 is being performed, the area controller 1002 of the MPU 1000 writes, in the switching register 148, data ("ON") about switching the memory area, which is used in the transfer of data from the external MPU 1200 to the MPU 1000, from the second memory area 131 to the backup area 132, so that the data is held in the switching register 148.

When the data ("ON") is held in the switching register 148, the address calculator 1202 of the external MPU 1200 controls the calculator 110 and writes the data to be sent to the MPU 1000 in the backup area 132 of the buffer 13. When all areas in the second memory area 131 are normal, the area controller 1002 of the MPU 1000 writes data ("OFF") in the switching register 148, so that the data is held in the switching register 148. However, if abnormality is detected in the second memory area 131, the area controller 1002 ensures that the data ("ON") is continually held in the switching register 148. When the data ("OFF") is held in the switching register 148, the calculator 110 of the external MPU 1200 writes, in the second memory area 131, the data to be sent to the MPU 1000.

In this way, in the information processing device according to the second embodiment, in parallel to transferring data from the MPU 1000 to the external MPU 1200, abnormality in the buffer 13 can be detected. Hence, it is possible to prevent a situation in which data transfer from the MPU 1000 to the external MPU 1200 cannot be performed due to performing detection of abnormality in the buffer 13.

Third Embodiment

In a third embodiment is explained an example in which an abnormality detection result of each of a plurality of divided areas, which are obtained by dividing the memory area of a buffer, is written in a register; writing of data is prohibited in such divided areas for which the respective abnormality detection results held in the register indicate that abnormality is detected; and writing of data is allowed in such divided areas for which the respective abnormality detection results held in the register indicate that abnormality is not detected. In the following explanation, the details identical to the second embodiment are not repeatedly explained.

Figure 16:
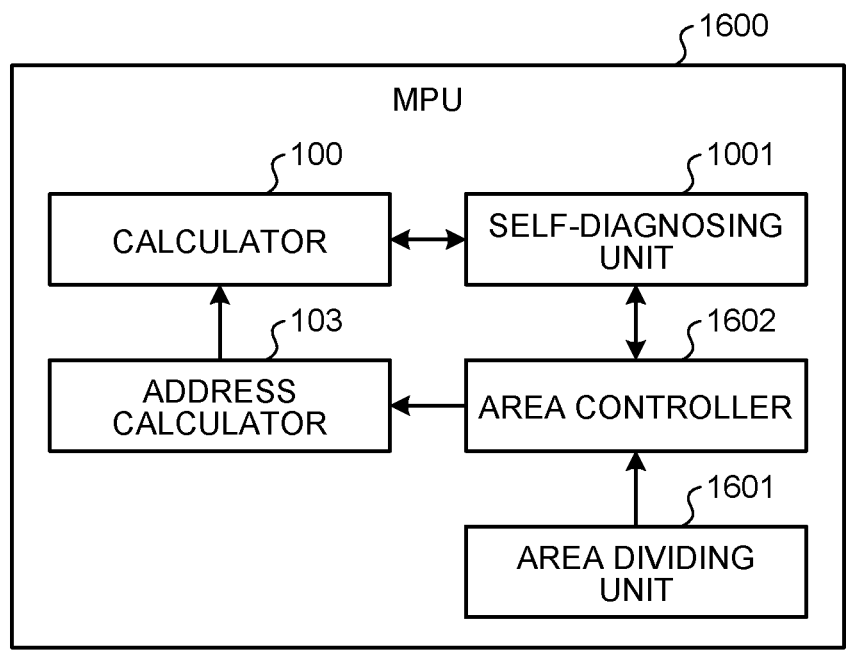
FIG. 16 is a block diagram illustrating a functional configuration of an MPU included in an information processing device according to a third embodiment.

FIG. 16 is a block diagram illustrating a functional configuration of an MPU included in an information processing device according to the third embodiment. As illustrated in FIG. 16, an MPU 1600 according to the third embodiment includes the calculator 100; the address calculator 103; the self-diagnosing unit 1001; an area dividing unit 1601 that divides the target memory area for abnormality detection into a plurality of memory areas (in the third embodiment, two divided areas, namely, a first-half divided area and a second-half divided area); and an area controller 1602 that, from among a plurality of divided areas, prohibits writing of data in the divided areas for which the respective abnormality detection results held in a register 1700 indicate that abnormality is detected and that allows writing of data in the divided areas for which the respective abnormality detection results held in the register 1700 indicate that abnormality is not detected.

Figure 17:
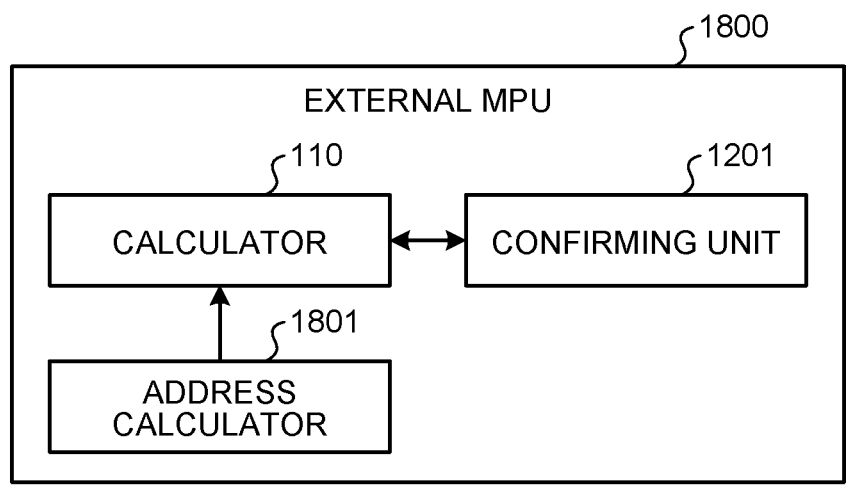
FIG. 17 is a block diagram illustrating a functional configuration of an external MPU included in the information processing device according to the third embodiment.

FIG. 17 is a block diagram illustrating a functional configuration of an external MPU included in the information processing device according to the third embodiment. As illustrated in FIG. 17, an external MPU 1800 according to the third embodiment includes the calculator 110; the confirming unit 1201; and an address calculator 1801. Herein, the address calculator 1801 refers to a first-half area register 149, a second-half area register 150, a destination register (first-half) 151, and a destination register (second-half) 152; and controls the memory areas in which the calculator 110 writes data.

Figure 18:
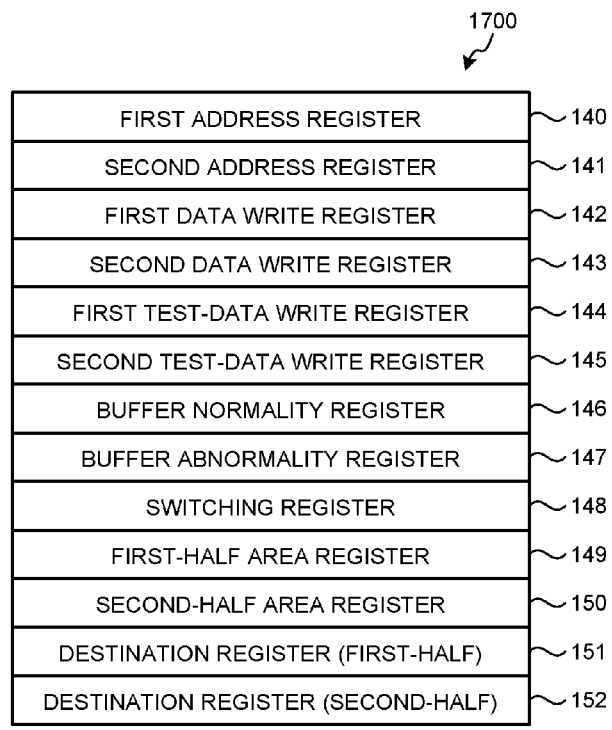
FIG. 18 is a diagram illustrating a register included in the information processing device according to the third embodiment.

FIG. 18 is a diagram illustrating a register included in the information processing device according to the third embodiment. In the third embodiment, as illustrated in FIG. 18, the register 1700 includes the first address register 140; the second address register 141; the first data write register 142; the second data write register 143; the first test-data write register 144; the second test-data write register 145; the buffer normality register 146; the buffer abnormality register 147; the switching register 148; the first-half area register 149 that is capable of holding data (in the third embodiment, called "ON") indicating detection of abnormality in the first-half divided area of the second memory area 131 (in other words, indicating movement of the data held in the first-half divided area of the second memory area 131 to the backup area 132); the second-half area register 150 that is capable of holding data (in the third embodiment, called "ON") indicating detection of abnormality in the second-half divided area of the second memory area 131 (in other words, indicating movement of the data held in the second-half divided area of the second memory area 131 to the backup area 132); the destination register (first-half) 151 that is capable of holding data (in the third embodiment, called "ON") indicating movement of the data held in the first-half divided area of the second memory area 131 to the first-half divided area of the backup area 132; and the destination register (second-half) 152 that is capable of holding data (in the third embodiment, called "ON") indicating movement of the data held in the second-half divided area of the second memory area 131 to the second-half divided area of the backup area 132.

Figure 19:
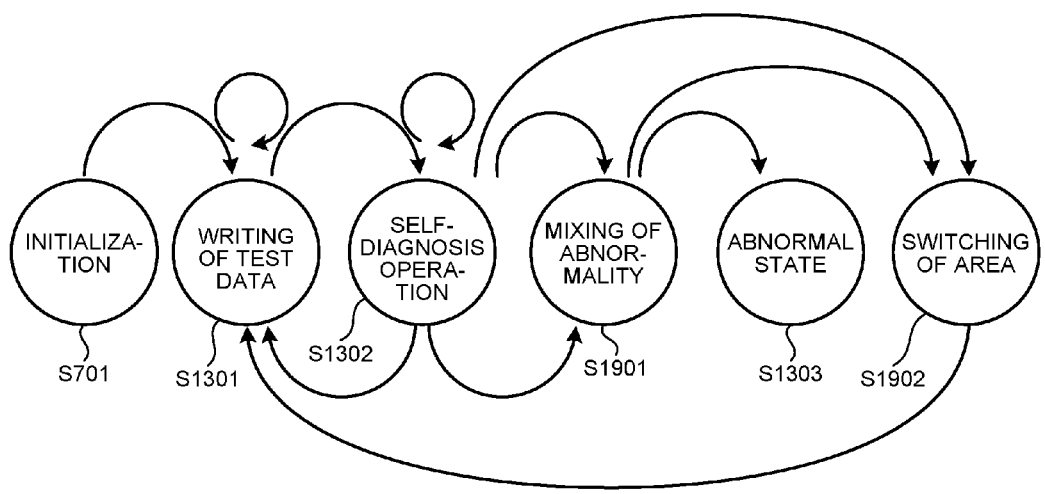
FIG. 19 is a diagram for explaining the writing of data in divided areas as performed by an MPU included in the information processing device according to the third embodiment.
Figure 20:
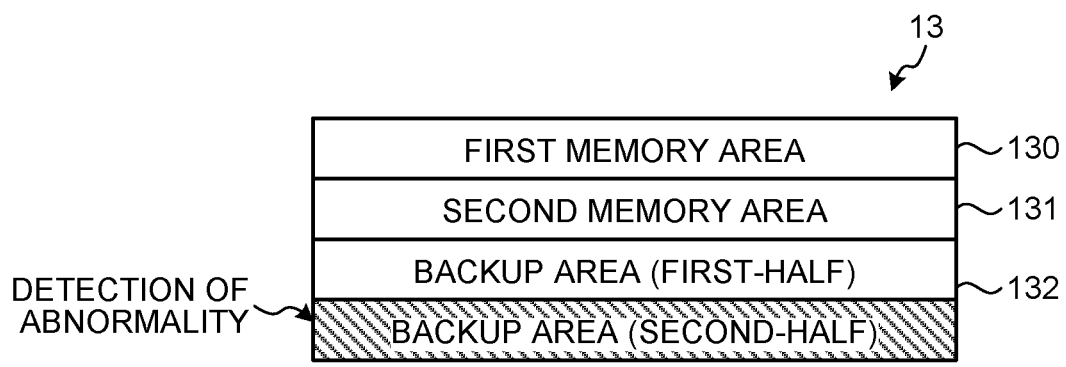
FIG. 20 is a diagram for explaining the writing of data in a buffer as performed in the information processing device according to the third embodiment.

Explained below with reference to FIGS. 19 and 20 is an operation in which, from among the divided areas of the target memory area for writing, writing of data is prohibited in the divided areas in which abnormality is detected and writing of data is allowed in the divided areas in which abnormality is not detected. FIG. 19 is a diagram for explaining the writing of data in divided areas as performed by an MPU included in the information processing device according to the third embodiment. FIG. 20 is a diagram for explaining the writing of data in a buffer as performed in the information processing device according to the third embodiment.

When the self-diagnosis operation (Step S1302 illustrated in FIG. 19) performed by the self-diagnosing unit 1001 results in the detection of abnormality in the backup area 132 (Step S1303 illustrated in FIG. 19), the area controller 1602 of the MPU 1600 determines whether the areas in the backup area 132 in which abnormality is detected are present in the first-half divided area or the second-half divided area that are obtained by the area dividing unit 1601 by dividing the backup area 132 (i.e., determines whether areas in which abnormality is detected are mixed) (Step S1901 illustrated in FIG. 19).

When the areas in the backup area 132 in which abnormality is detected are determined to be present in the second-half divided area of the backup area 132 (see FIG. 20), the area controller 1602 instructs the address calculator 103 to switch the target memory area for data writing from only the first-half divided area of the first memory area 130 to the first-half divided area of the backup area 132 (Step S1902 illustrated in FIG. 19). In other words, the area controller 1602 prohibits the address calculator 103 from switching the target memory area for data writing to the second-half divided area of the backup area 132. Then, the address calculator 103 writes, in the first-half divided area of the backup area 132, the data to be written only in the first-half divided area of the first memory area 130.

After the target memory area for data writing is switched from the first-half divided area of the first memory area 130 to the first-half divided area of the backup area 132, the self-diagnosing unit 1001 performs the self-diagnosis operation regarding the first-half divided area of the first memory area 130. If the self-diagnosis operation results in non-detection of abnormality in the first-half divided area of the first memory area 130, then the area controller 1602 instructs the address calculator 103 to switch the target memory area for data writing from the first-half divided area of the backup area 132 to the first-half divided area of the first memory area 130. Subsequently, the address calculator 103 writes, in the first-half divided area of the first memory area 130, the data to be written in the first-half divided area of the backup area 132.

Subsequently, the area controller 1602 instructs the address calculator 103 to switch the target memory area for data writing from only the second-half divided area of the first memory area 130 to the first-half divided area of the backup area 132 (Step S1902 illustrated in FIG. 19). In other words, the area controller 1602 prohibits the address calculator 103 from switching the target memory area for data writing to the second-half divided area of the backup area 132. Then, the address calculator 103 writes, in the first-half divided area of the backup area 132, the data to be written only in the second-half divided area of the first memory area 130.

After the target memory area for data writing is switched from the second-half divided area of the first memory area 130 to the first-half divided area of the backup area 132, the self-diagnosing unit 1001 performs the self-diagnosis operation with respect to the second-half divided area of the first memory area 130. If the self-diagnosis operation results in non-detection of abnormality in the second-half divided area of the first memory area 130, then the area controller 1602 instructs the address calculator 103 to switch the target memory area for data writing from the first-half divided area of the backup area 132 to the second-half divided area of the first memory area 130. Subsequently, the address calculator 103 writes, in the second-half divided area of the first memory area 130, the data to be written in the first-half divided area of the backup area 132.

After performing the self-diagnosis operation with respect to the first memory area 130, the area controller 1602 performs abnormality detection with respect to the second memory area 131 too in an identical manner to abnormality detection performed with respect to the first memory area 130. While abnormality detection with respect to the second memory area 131 is being performed, the area controller 1602 of the MPU 1600 writes, in the switching register 148, data ("ON") about switching the memory area, which is used in the transfer of data from the external MPU 1800 to the MPU 1600, from the second memory area 131 to the backup area 132, so that the data is held in the switching register 148. Moreover, the area controller 1602 writes, in the first-half area register 149, data ("ON") indicating detection of abnormality in the first-half divided area of the second memory area 131, so that the data is held in the first-half area register 149; as well as writes, in the destination register (first-half) 151, data ("ON") indicating movement of the data held in the first-half divided area of the second memory area 131 to the first-half divided area of the backup area 132, so that the data is held in the destination register (first-half) 151.

When the data ("ON") is held in the first-half area register 149 and when the data ("ON") is held in the destination register (first-half) 151, the address calculator 1801 of the external MPU 1800 writes, in the first-half divided area of the backup area 132, only the data to be written in the first-half divided area of the second memory area 131. The self-diagnosing unit 1001 of the MPU 1600 performs the self-diagnosis operation with respect to the first-half divided area of the second memory area 131. If the self-diagnosis operation results in non-detection of abnormality in the first-half divided area of the second memory area 131, then the area controller 1602 writes data ("OFF") in the first-half area register 149 so that the data is held in the first-half area register 149, as well as writes data ("OFF") in the destination register (first-half) 151 so that the data is held in the destination register (first-half) 151.

Moreover, the area controller 1602 writes, in the second-half area register 150, data ("ON") indicating detection of abnormality in the second-half divided area of the second memory area 131 so that the data is held in the second-half area register 150; as well as writes, in the destination register (first-half) 151, data ("ON") indicating movement of the data held in the second-half divided area of the second memory area 131 to the first-half divided area of the backup area 132.

When the data ("ON") is held in the second-half area register 150 and when the data ("ON") is held in the destination register (first-half) 151, the address calculator 1801 of the external MPU 1800 writes, in the first-half divided area of the backup area 132, only the data to be written in the second-half divided area of the second memory area 131. The self-diagnosing unit 1001 of the MPU 1600 performs the self-diagnosis operation with respect to the second-half divided area of the second memory area 131. If the self-diagnosis operation results in non-detection of abnormality in the second-half divided area of the second memory area 131, then the area controller 1602 writes data ("OFF") in the second-half area register 150 so that the data is held in the second-half area register 150, as well as writes data ("OFF") in the destination register (first-half) 151 so that the data is held in the destination register (first-half) 151.

In this way, in the information processing device according to the third embodiment, even if abnormality is detected in any of a plurality of divided areas obtained by dividing the memory area of the buffer 13, the divided areas other than the divided areas detected to have abnormality can be used in transferring the data. That enables lessening the decline in the data transfer speed attributed to detection of abnormality in a divided area.

As described above, according to the first to third embodiments, abnormal data attributed to abnormality in the buffer 13 can be prevented from being transferred.

In the embodiments, when an instruction for initialization of the information processing device is issued, the self-diagnosing unit 101 or the self-diagnosing unit 1001 writes test data in the buffer 13 and performs a self-diagnosis operation with respect to the buffer 13. However, that is not the only possible case. Alternatively, for example, the self-diagnosing unit 101 or the self-diagnosing unit 1001 can perform operations of writing test data and performing a self-diagnosis operation at regular intervals. Still alternatively, every time a predetermined volume of data is written in the buffer 13 or every time data is written in the buffer 13 for a predetermined number of times, the self-diagnosing unit 101 or the self-diagnosing unit 1001 can write test data in the buffer 13 and perform a self-diagnosis operation.

Meanwhile, programs executed in the information processing device according to the embodiments are stored in advance in a ROM (Read Only Memory). Alternatively, the programs executed in the information processing device according to the embodiments can be recorded as installable or executable files in a computer-readable recording medium such as a CD-ROM, a flexible disk (FD), a CD-R, or a DVD (Digital Versatile Disk).

Still alternatively, the programs executed in the information processing device according to the embodiments can be saved in a downloadable manner on a computer connected to a network such as the Internet. Still alternatively, the programs executed in the information processing device according to the embodiments can be distributed over a network such as the Internet.

The program executed in the MPU 10, the MPU 1000, or the MPU 1600 of the information processing device according to the embodiments contains modules for the corresponding constituent elements (the calculator 100; the self-diagnosing unit 101 or the self-diagnosing unit 1001; the area controller 102, the area controller 1002, or the area controller 1602; the address calculator 103; and the area dividing unit 104 or the area dividing unit 1601). As the actual hardware, for example, the MPU 10, the MPU 1000, or the MPU 1600 (processor) reads the program from the ROM mentioned above and runs it so that the program is loaded in a main memory device. As a result, the calculator 100; the self-diagnosing unit 101 or the self-diagnosing unit 1001; the area controller 102, the area controller 1002, or the area controller 1602; the address calculator 103; and the area dividing unit 104 or the area dividing unit 1601 are generated in the main memory device.

The program executed in the external MPU 11, the external MPU 1200, or the external MPU 1800 of the information processing device according to the embodiments contains modules for the corresponding constituent elements (the processor 110; the confirming unit 111 or the confirming unit 1201; and the address calculator 112, the address calculator 1202, or the address calculator 1801). As the actual hardware, for example, the external MPU 11, the external MPU 1200, or the external MPU 1800 (processor) reads the program from the ROM mentioned above and runs it so that the program is loaded in a main memory device. As a result, the processor 110; the confirming unit 111 or the confirming unit 1201; and the address calculator 112, the address calculator 1202, or the address calculator 1801 are generated in the main memory device.

While certain embodiments of the invention have been described, the embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An information processing device comprising:
a buffer that includes a plurality of memory areas which store target data for transfer;
a memory that stores a fact that predetermined abnormality detection data is written in the buffer and stores abnormality detection result of the buffer, the abnormality detection result being written by an external controller which controls a first control target; and
a controller that
controls a second control target which is different than the first control target,
in parallel to an operation of writing data in the memory area serving as writing target from among the plurality of the memory areas, writes, in the memory areas other than the memory areas serving as the writing target, the abnormality detection data to be transferred to the external controller,
writes the fact in the memory, and
when the abnormality detection result indicates detection of abnormality, prohibits writing of data in at least such the memory area, from among the memory areas in the buffer, in which abnormality is detected.

2. The information processing device according to claim 1, wherein the memory stores the abnormality detection result of the buffer, the abnormality detection result being detected by the external controller according to whether or not the abnormality detection data read from the buffer matches with predetermined abnormality detection data.

3. The information processing device according to claim 1, wherein in the memory is written the abnormality detection result of each of a plurality of divided areas obtained by dividing the memory area, and the controller prohibits writing of data in the divided area for which corresponding abnormality detection result indicates detection of abnormality, and allows writing of data in the divided area for which corresponding abnormality detection result indicates non-detection of abnormality.

4. The information processing device according to claim 1, wherein the controller writes the abnormality detection data in the buffer at predetermined intervals.

5. The information processing device according to claim 1, wherein, every time a predetermined volume of data is written in the buffer, the controller writes the abnormality detection data in the buffer.

6. The information processing device according to claim 1, wherein, every time data is written in the buffer for a predetermined number of times, the controller writes the abnormality detection data in the buffer.

7. An information processing method implemented in an information processing device including a controller which controls a second control target which is different than a first control target controlled by an external controller, comprising:

when an instruction for initialization of the information processing device is issued in parallel to an operation of writing data in a memory area serving as writing target from among a plurality of memory areas which are included in a buffer and store target data to be transferred to the external device, writing, by the controller, predetermined abnormality detection data in the memory areas other than the memory areas serving as the writing target;

writing, by the controller, a fact in a memory, the fact being a fact that the abnormality detection data is written in the buffer; and prohibiting, by the controller, when an abnormality detection result indicates detection of abnormality, writing of data in at least such the memory area, from among the memory areas in the buffer, in which abnormality is detected, the abnormality detection result being written regarding the buffer by the external controller in the memory.

8. A computer program product including programmed instructions embodied in and stored on a non-transitory computer readable medium, wherein the instructions, when executed by a computer, cause the computer to perform:

controlling a second control target which is different than a first control target controlled by an external controller, in parallel to an operation of writing data in a memory area serving as writing target from among a plurality of memory areas which are included in a buffer and store target data to be transferred to the external device, writing, in the memory areas other than the memory areas serving as the writing target predetermined abnormality detection data, writing a fact in a memory, the fact being a fact that the abnormality detection data is written in the buffer, and when an abnormality detection result indicates detection of abnormality, prohibiting writing of data in at least such the memory area, from among the memory areas in the buffer, in which abnormality is detected, the abnormality detection result being written regarding the buffer by the external controller in the memory.

9. The information processing method according to claim 7, wherein in the memory is written the abnormality detection result of each of a plurality of divided areas obtained by dividing the memory area, the abnormality detection result being detected by the external controller according to whether or not the abnormality detection data read from the memory area matches with predetermined abnormality detection data, and the prohibiting includes prohibiting writing of data in the divided area for which corresponding abnormality detection result indicates detection of abnormality, further comprising allowing, by the controller, writing of data in the divided area for which corresponding abnormality detection result indicates non-detection of abnormality.

10. The computer program product according to claim 8, wherein in the memory is written the abnormality detection result of each of a plurality of divided areas obtained by dividing the memory area, the abnormality detection result being detected by the external controller according to whether or not the abnormality detection data read from the memory area matches with predetermined abnormality detection data, and the prohibiting includes prohibiting writing of data in the divided area for which corresponding abnormality detection result indicates detection of abnormality, the instructions further cause the computer to perform allowing writing of data in the divided area for which corresponding abnormality detection result indicates non-detection of abnormality.

* * * * *